United States Patent [19]

Müller et al.

[11] 4,322,982
[45] Apr. 6, 1982

[54] FLOWMETER

[75] Inventors: Stefan Müller; Gerhard Thun, both of Karlsdorf; Wolfgang Glauner, Karlsruhe, all of Fed. Rep. of Germany

[73] Assignee: Kernforschungszentrum Karlsruhe GmbH, Karlsruhe, Fed. Rep. of Germany

[21] Appl. No.: 120,514

[22] Filed: Feb. 11, 1980

[30] Foreign Application Priority Data

Feb. 10, 1979 [DE] Fed. Rep. of Germany ....... 2905070

[51] Int. Cl.$^3$ ............................................. G01F 1/32
[52] U.S. Cl. ............................ 73/861.22; 73/861.12; 73/861.13
[58] Field of Search ........... 73/861.06, 861.12, 861.13, 73/861.15, 861.22

[56] References Cited

U.S. PATENT DOCUMENTS 3,736,798  6/1973  Wood et al. ............... 73/861.13
3,775,673  11/1973 Watanabe .................. 73/861.22
4,145,924  3/1979  Müller ........................ 73/861.06

FOREIGN PATENT DOCUMENTS 2632042  1/1978  Fed. Rep. of Germany.

OTHER PUBLICATIONS

Appell, et al., "Solid State Current Meters", Sep. 1973.
Bonfig–Technische Durchflus–Messung–pp. 146–148, 1977.
Clayton–Modern Developments in Flow Measurement–pp. 359–360, 1972.

Primary Examiner—Charles A. Ruehl
Attorney, Agent, or Firm—Spencer & Kaye

[57] ABSTRACT

A flowmeter for measuring the flow of liquid metal in a conduit has a tubular drag body which extends diametrically into the conduit and terminates, with a closed end, within the flowing liquid. The drag body which generates vortexes in the flow, accommodates a magnet that generates a magnetic field in the liquid metal. The potential difference induced in the liquid and being a function of the flow velocity and the frequency of vortex detachment, is sensed by electrodes which are situated within the drag body and, for the purpose of being exposed directly to the liquid, project through respective bores provided in the drag body. The electrodes are bonded gastight to the drag body.

3 Claims, 11 Drawing Figures

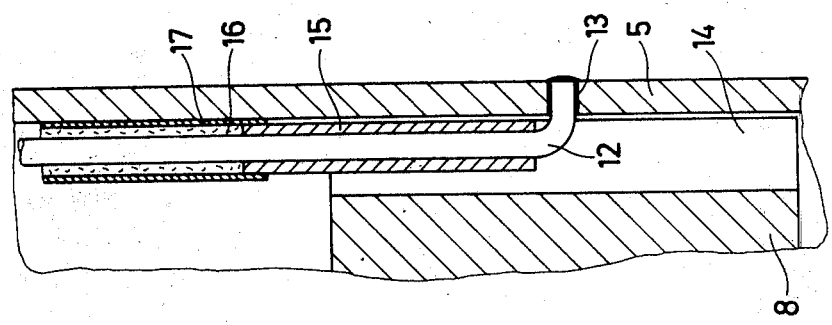
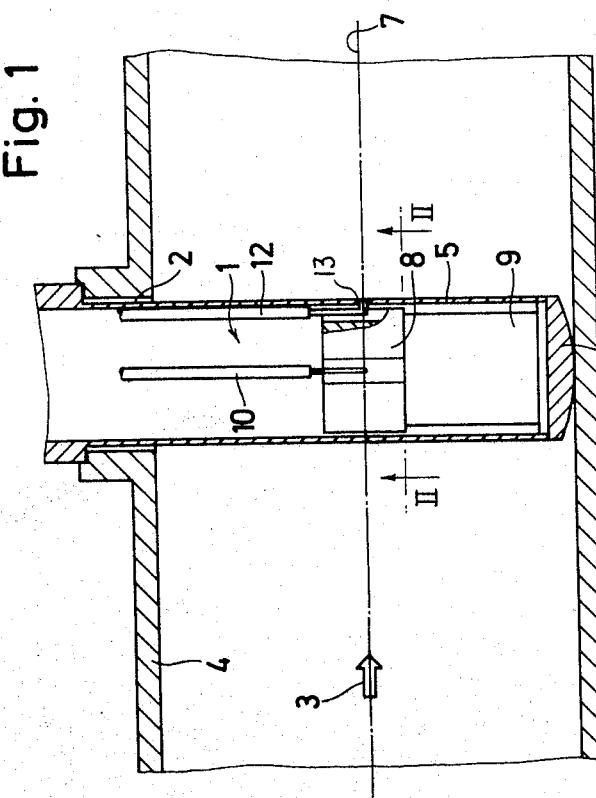

FLOWMETER

BACKGROUND OF THE INVENTION

This invention relates to a flowmeter for measuring a liquid metal flow at temperatures approximately up to 600° C. in a pipe conduit having a nominal diameter of up to approximately 1,000 mm. The flowmeter includes a magnet for inducing an electric potential difference in the liquid metal flowing through the magnetic field and further has electrodes for measuring the potential difference.

Nuclear reactors which are cooled with liquid metal such as sodium can be operated only if the liquid metal flow is measured in all the principal coolant conduits and the requirement concerning redundancy and diversity of the flowmeters to be used is met in accordance with safety regulations. At each measuring location thus at least two redundant flowmeters are used which operate on unlike measuring principles.

An uncontrolled reduction in the coolant flow caused, for example, by the breakdown of a pump, leads to an insufficient heat removal and thus endangers the entire installation. Further, flow measurement is necessary for determining the reactor output, because only by means of a precise monitoring can the nuclear power installation be operated in an economical manner.

It is known to induce a potential difference in a flowing liquid metal and to measure the potential difference (which depends from the flow velocity) by means of electrodes and apply the signals to a data processor. For generating a magnetic field in the flowing liquid metal, at the outside of the conduit permanent magnets or coils are arranged whose dimensions and weight, particularly in case of large nominal pipe diameters, reach magnitudes that lead to structural and operational difficulties and render their use in a pool reactor unfeasible. The electrodes are welded to the outside of the coolant conduit. A redundant arrangement of several flowmeters of this known type which are independent from one another is not feasible because of the large weight and substantial spatial requirements. Flowmeters of these known types are discussed, for example, in C. G. Clayton, MODERN DEVELOPMENTS IN FLOW MEASUREMENT, pages 359 and 360, published by Peter Peregrinus Ltd., London 1972.

It is a further disadvantage of systems with permanent magnets that they are affected by aging and by temperature conditions and cannot be calibrated in situ.

It is further known to arrange in the flowing medium a drag body which generates in the medium a Karman vortex street as a free oscillation. The flow velocity is determined by measuring the vortex frequency. As sensors, for example, thermistors are used which are arranged at an upper face of the drag body or are situated in the inside thereof. Such a flowmeter is described, for example, by K. W. Bonfig, TECHNISCHE DURCHFLUSSMESSUNG, pages 146-148, published by Vulkan-Verlag, Essen, 1977. Measuring systems of this type are not adapted for measuring liquid metals because the thermistors cannot be used under temperature conditions prevailing in such an environment.

Further, German Laid-Open Application (Offenlegungsschrift) No. 2,632,042 discloses a probe-like permanent magnet flowmeter. In the probe there are arranged two disc-shaped permanent magnets at a predetermined distance from one another for inducing a first and a second voltage and electrodes for measuring the voltages. The flow velocity is determined by measuring the transit time of the velocity fluctuation. In case of large nominal conduit diameters, however, such a probe can respond only to a small part of the conduit cross section. Further, since the probe is submerged directly into the liquid metal and is to be arranged coaxially with respect to the conduit axis, it can be replaced only after entirely emptying the pipe conduit.

SUMMARY OF THE INVENTION

It is an object of the invention to provide an improved flowmeter for liquid metal which may find application in large-diameter pipe conduits, whose magnets can be replaced without interrupting the liquid flow and which in general is free from the disadvantages of flowmeter arrangements known heretofore.

These objects and others to become apparent as the specification progresses, are accomplished by the invention, according to which, briefly stated, the flowmeter comprises a tubular drag body which extends diametrally into the pipe and terminates, with a closed end, within the flowing liquid. The drag body which generates vortexes in the flow, accommodates a magnet that generates a magnetic field in the liquid metal. The potential difference induced in the liquid and being a function of the flow velocity and the frequency of vortex detachment, is sensed by electrodes which are situated within the drag body and, for the purpose of being exposed directly to the liquid, project through respective bores provided in the drag body. The electrodes are bonded gastight to the drag body.

The advantages achieved by the invention may be summarized as follows:

(1) the measuring sensor projects, as a drag body, diametrally into the pipe conduit and, by virtue of its tubular shape, it is adapted to accommodate the field generating magnets, their spacers and the electrodes;

(2) the inner space of the drag body attached to the wall of the pipe conduit by means of a flange or a weld, is accessible from the outside;

(3) in one and the same drag body there may be disposed mutually independent flowmeters in a distribution along the diameter of the conduit;

(4) by using three electrodes for one measuring station, for example, the first and the second electrodes may measure a mean dc voltage value, the first and the third as well as the second and the third electrodes may measure the vortex frequencies on the left and the right side of the drag body and the formation of cross correlations is feasible;

(5) the flowmeter can be calibrated in situ;

(6) the measuring sensor designed as a drag body may be used in pool reactors and loop reactors;

(7) in case of appropriate electric filtering and amplification of the measuring signals, a direct coupling of a conventional frequency counter is possible; and (8) the flowmeter is insensitive to radiations and may be used at temperatures up to 600° C. and, for a short period, up to 750° C.

BRIEF DESCRIPTION OF THE DRAWINGS

FIG. 1 is a longitudinal sectional view of a preferred embodiment of the invention.

FIG. 2 is a sectional view along line II—II of FIG. 1.

FIG. 3 is a fragmentary longitudinal sectional view, on an enlarged scale, of a detail of the structure illustrated in FIG. 1.

DESCRIPTION OF THE PREFERRED EMBODIMENTS

Figure 4:
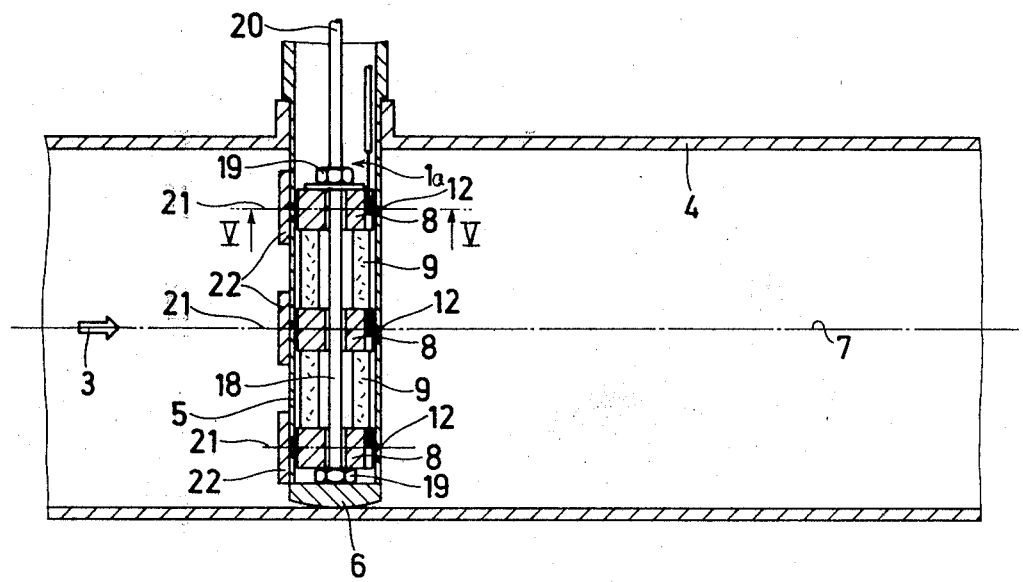
FIG. 4 is a longitudinal sectional view of another preferred embodiment of the invention.

Turning now to FIG. 1, there is illustrated a preferred embodiment which shows the structural principles of the invention.

A measuring probe generally indicated at 1 projects through a lateral bore 2 of a pipe conduit 4 diametrically into a flow 3 of liquid metal (such as liquid sodium), constituting a reactor coolant. The measuring probe 1 which is welded to the conduit 4 in the zone of the lateral opening 2, comprises a tubular drag body 5 which, at its end situated within the passage defined by the conduit 4, is closed gastight by means of a cap 6 welded thereto. The drag body 5 is open at its other end situated outside the pipe 4. Within the drag body 5, in the zone of the axis 7 of the pipe conduit 4, there is supported a disc-shaped magnet 8 (made, for example, of AlNiCo (VIII) by means of a spacer 9 (made, for example, of a non-ferromagnetic material, such as MgO). The drag body 5 may be made of a non-ferromagnetic material of low electric conductivity, such as SS304.

The axially magnetized magnet 8 induces a potential difference in the liquid metal stream 3. The potential difference is sensed with first, second and third electrodes 10, 11, 12 (see also FIG. 2).

Details of the electrode arrangement are shown in FIG. 3. The electrodes 10, 11, 12 are welded gastight into bores 13 of the drag body 5 in such a manner that they are exposed to a direct contact by the flowing liquid. The bores 13 for the electrodes 10, 11, 12 are, as shown in FIG. 1, situated in the central plane of the magnet 8. The latter has axial recesses 14 for accommodating the respective electrodes 10, 11, 12. In the zone of the recesses 14 of the magnet 8 the electrodes 10, 11, 12 are electrically insulated by a tube 15 made of sintered $Al_2O_3$. The electrodes 10, 11, 12 which are made for example, of WN 4948 are insulated by means of a powdered insulating material 16 such as $Al_2O_3$ or MgO and are provided with a metallic jacket 17 made, for example, of WN 4948.

Turning now to FIG. 4, there is illustrated a flowmeter 1a which has a plurality of magnets 8 positioned by means of spacers 9 in a predetermined relationship with one another. The magnets 8 and the spacers 9 are held together as a rigid unit by means of a bolt 18 and nuts 19. The externally accessible free end 20 of the bolt 18 facilitates the installation of the unit 8, 9. Similarly to the embodiment described in connection with FIG. 1, the sensing (working) end of first, second and third electrodes 10, 11, 12 are arranged in the central plane 21 of each magnet 8. The respective central plane 21 halves the associated magnet 8 and is parallel to the conduit axis 7. The sensor ends of the electrodes 10 and 11 are at diametrically opposite points of the respective magnet and an imaginary connecting line between the sensor ends of the electrodes 10 and 11 is perpendicular to the conduit axis 7. The sensor end of the electrode 12 is arranged symmetrically with respect to the electrodes 10 and 12 at the downstream-facing side of the tubular drag body 5. The electrodes 10, 11 and 12 pass through respective recesses 14 of the magnets 8 to the open end of the drag body 5.

Figure 5:
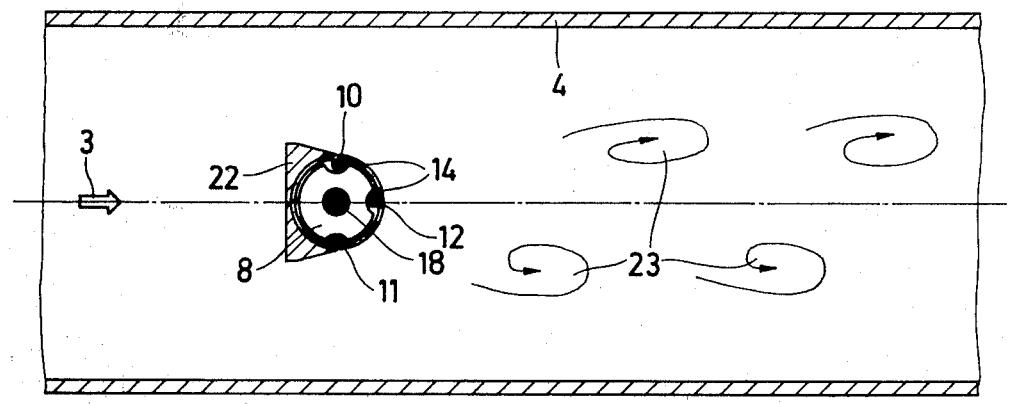
FIG. 5 is a sectional view taken along line V—V of FIG. 4.

Turning now to FIG. 5, in the zone of each magnet 8, at the outer side of the drag body 5 there is arranged a drag member 22 for enhancing the vortex formation in the liquid metal flow 3. The drag body 5, with the drag members 22, effects a disturbance in the liquid metal flow 3; as a result, downstream of the drag body 5, alternately in the zone of the first and the second electrodes 10 and 11, vortexes 23 detach and form a Karman vortex street. The voltage induced by one magnet 8 in the liquid metal stream 3 is U=c.v, wherein c is a constant and v is the liquid flow velocity.

The frequency of vortex detachment is obtained from the relationship $$f = k(S.v_o)/d,$$

wherein k is a correction factor, S is the Strouhal number, $v_o$ is the starting flow velocity of the liquid metal and d is the diameter of the drag body 5.

The simple measurement of the means voltage value yields the flow velocity v with sufficient accuracy only it the liquid metal flow has a constant, not too high temperature and therefore temperature variations and aging do not distort the measuring results. The measuring of the vortex frequency is, in contradistinction, independent from temperature and aging effects.

Figure 6:
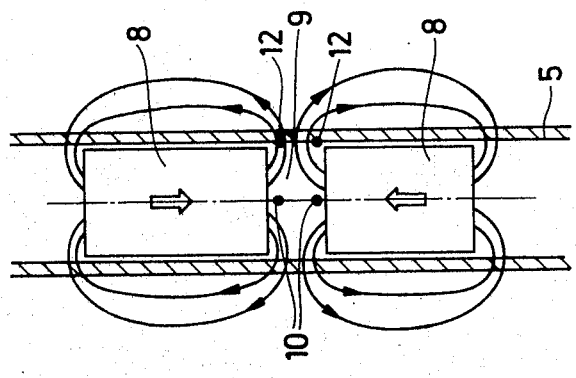
FIG. 6 is a longitudinal schematic view illustrating some of the components of the structure shown in FIG. 4.

In case several magnets 8 are used, for example, to provide redundant measurements in several zones of a liquid metal flow 3 in a conduit 4 of large nominal diameter, it is advantageous to magnetize adjacent magnets in opposite directions as illustrated in FIG. 6. The resulting field reaches farther into the liquid metal stream resulting in an increase of the measuring voltage. In such a case it may be advantageous to arrange the electrodes 10, 11 and 12 not in the central plane of the magnets 8 but in the zone of the greatest magnetic field strength, thus, between the magnets 8.

Figure 7A:
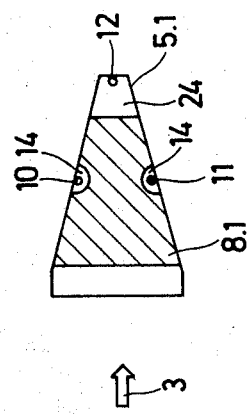
FIGS. 7a, 7b and 7c are schematic cross-sectional views of a component forming part of the structure according to the invention and having different cross-sectional outlines.
Figure 7B:
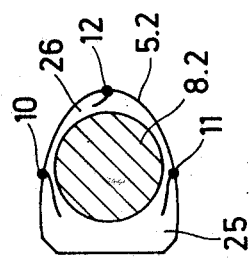
Figure 7C:
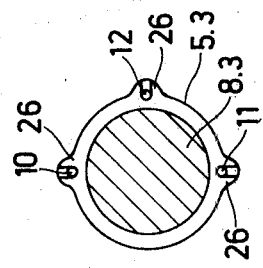

FIGS. 7a, 7b and 7c show variations of cross-sectional shapes of the drag bodies.

The drag body 5.1 in FIG. 7a has a triangular cross section and surrounds a triangular magnet 8.1 having recesses 14 for the electrodes 10 and 11. By virtue of the different cross-sectional shape of the magnets 8.1 and drag body 5.1 there is obtained a recess 24 for the third electrode 12.

In another embodiment according to FIG. 7b, the cross-sectional shape of the magnets 8.2 is circular, whereas that of the drag body 5.2 is approximately semi-elliptical. In this manner, for the first and second electrodes 10 and 11 on the one hand and for the third electrode 12 respective recesses 25 and 26 are obtained.

As shown in the embodiment according to FIG. 7c, the drag body 5.3 has a circular cross section and, in the zone of electrodes 10, 11 and 12 it is provided with axially extending protuberances 26. The magnet 8.3 has a circular cross-sectional outline.

The induced voltage measured with the electrodes 10, 11 and 12 is composed of a mean value which depends from the mean liquid flow velocity and a voltage value which is superposed on the means value and which is dependent from the vortex frequency. This second voltage value is thus likewise dependent from the velocity of the liquid flow.

Figure 8:
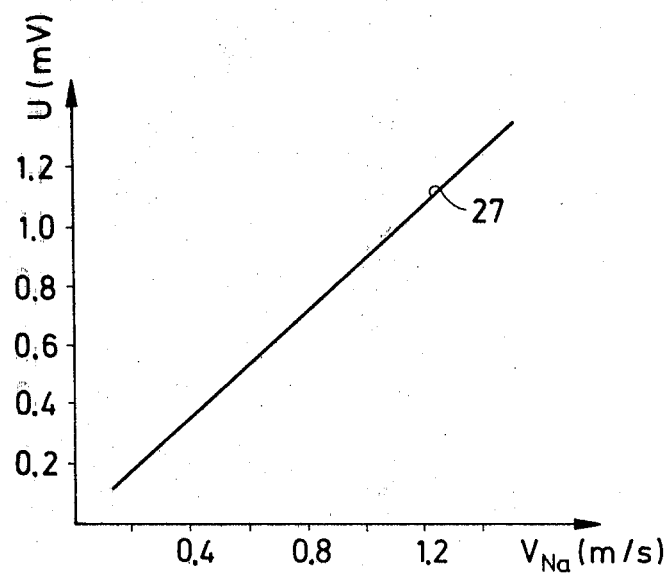
FIG. 8 is a diagram illustrating the mean dc voltage value as a function of the velocity of liquid sodium.
Figure 9:
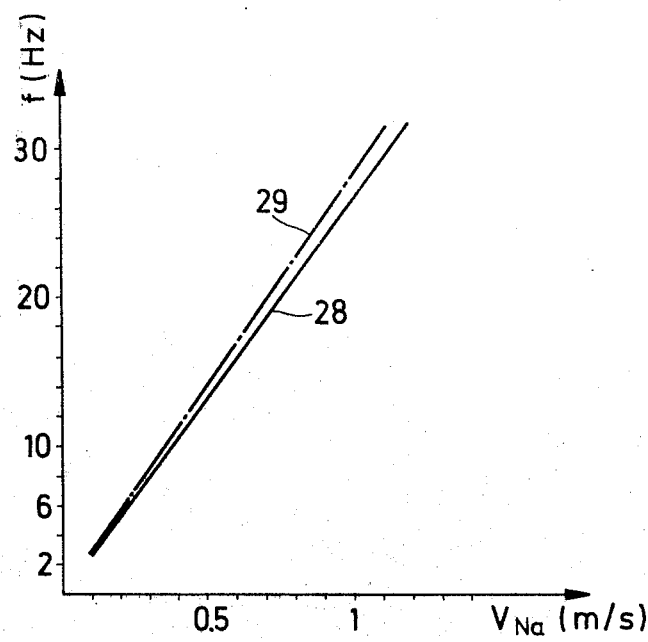
FIG. 9 is a diagram illustrating the vortex frequency as a function of the velocity of liquid sodium.

The diagrams of FIGS. 8 and 9 illustrate measurements taken with a flowmeter structured according to FIG. 1. The drag body 5 had a diameter of 12 mm, the magnet 8 was AlNiCo 450 and had a diameter of 10 mm and an axial length of 7 mm. The liquid metal was liquid sodium in a pipe conduit of an inner diameter of 36 mm. The measurements were conducted at a temperature of 300° C.

FIG. 8 shows the mean dc voltage value 27 appearing on the electrodes 10 and 11 (FIG. 2) as a function of the velocity v of the liquid metal flow 3. FIG. 9 illustrates the vortex frequency 28, 29 as a function of the liquid metal flow velocity. In each case there is a linear relationship between the measured magnitude and the flow velocity v. The straight curve 28 is the measured vortex frequency whereas the straight curve 29 represents the computed vortex frequency.

It is to be understood that the flowmeter according to the invention can be designed such that in case of large nominal pipe diameters, in the drag body 5 there are arranged a plurality of magnets 8 with a corresponding number of electrodes 10, 11 and 12. In this manner it is feasible to determine, by appropriate data processing, a mean value of the flow velocity in case of differing flow velocities over a given pipe cross section.

It will be understood that the above description of the present invention is susceptible to various modifications, changes and adaptations, and the same are intended to be comprehended within the meaning and range of equivalents of the appended claims.

What is claimed is:

1. In a flowmeter for measuring the flow of liquid metal in a conduit having a longitudinal axis; the flowmeter including a magnet for generating a magnetic field in the liquid metal whereby a potential difference is induced in the liquid metal as it flows through the magnetic field and electrodes for measuring said potential difference; the improvement comprising a tubular drag body projecting unilaterally through a wall of said conduit into said conduit in a diametral orientation with respect thereto for generating vortexes in the liquid metal flowing in said conduit; said tubular drag body having a closed surface within said conduit; said magnet and said electrodes being accommodated within said tubular drag body; said tubular drag body having apertures through which project ends of respective electrodes for direct exposure to the liquid metal in said conduit; said electrodes being bonded airtight to said tubular drag body; said tubular drag body further having a triangular cross-sectional shape and said magnet having a triangular cross-sectional shape conforming to the cross-sectional shape of said tubular drag body and substantially filling the inner cross-sectional area defined by said tubular drag body.

2. A flowmeter as defined in claim 1, wherein outer faces of said magnet define with inner faces of said tubular drag body small clearances for accommodating respective said electrodes.

3. In a flowmeter for measuring the flow of liquid metal in a conduit having a longitudinal axis; the flowmeter including a magnet for generating a magnetic field in the liquid metal whereby a potential difference is induced in the liquid metal as it flows through the magnetic field and electrodes for measuring said potential difference; the improvement comprising a tubular drag body projecting unilaterally through a wall of said conduit into said conduit in a diametral orientation with respect thereto for generating vortexes in the liquid metal flowing in said conduit; said tubular drag body having a closed surface within said conduit; said magnet and said electrodes being accommodated within said tubular drag body; said tubular drag body having apertures through which project ends of respective electrodes for direct exposure to the liquid metal in said conduit; said electroes being bonded airtight to said tubular drag body; said tubular drag body further having, in the zone of said electrodes, an outwardly oriented, axially extending bulging portion for accommodating said electrodes and for intensifying the generation of vortexes.

* * * * *

UNITED STATES PATENT AND TRADEMARK OFFICE
CERTIFICATE OF CORRECTION

PATENT NO. : 4,322,982

DATED : April 6, 1982

INVENTOR(S) : Stefan Müller, et al.

It is certified that error appears in the above—identified patent and that said Letters Patent is hereby corrected as shown below:

On the title page, Inventors names should read:

-- Stefan Müller, Karlsruhe; Gerhard Thun, Karlsdorf; Wolfgang Glauner, Karlsruhe; all of Fed. Rep. of Germany --.

Column 4, line 32 "it" should read -- if --.

Signed and Sealed this

Thirty-first Day of August 1982

[SEAL]

Attest:

Attesting Officer

GERALD J. MOSSINGHOFF

Commissioner of Patents and Trademarks